Oct. 1, 1946.       F. E. WELLS        2,408,499
PISTON EXPANDER
Filed Aug. 21, 1945
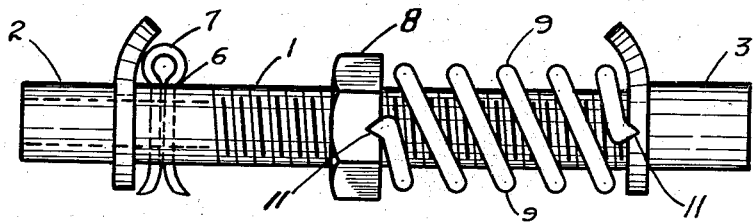
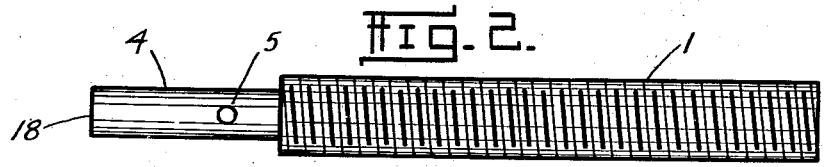
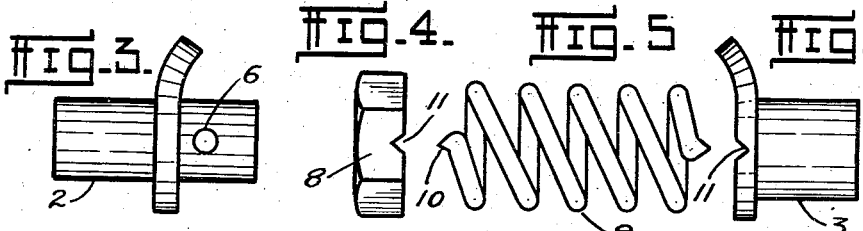
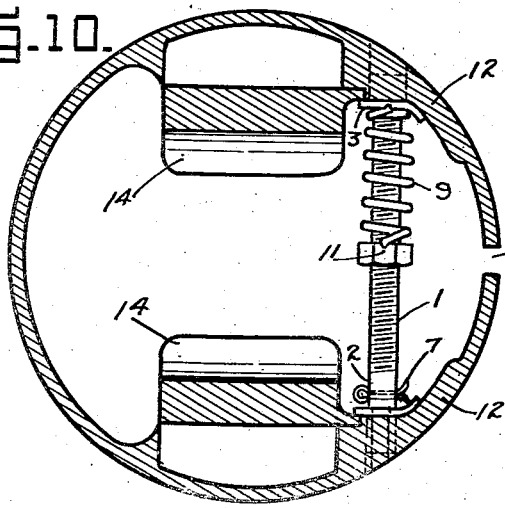
Frank E. Wells.
INVENTOR.
BY *W. B. Harpman*
ATTORNEY.

Patented Oct. 1, 1946

2,408,499

UNITED STATES PATENT OFFICE 2,408,499

PISTON EXPANDER

Frank E. Wells, Alliance, Ohio

Application August 21, 1945, Serial No. 611,750

7 Claims. (Cl. 309—12)

This invention relates to a piston expander.

The principal object of this invention is the provision of a piston expander that may be used to provide the desired expansion to the skirt of a piston.

A further object of this invention is the provision of a piston expander that will provide desired expansion to the skirt of a piston and maintain the expansion at all times.

A still further object of this invention is the provision of a piston expander incorporating a tension means whereby the expanding pressure exerted against the skirts of the piston is made flexible so as to compensate for the expansion and contraction of the piston resulting from heat.

A still further object of this invention is the provision of a piston expander incorporating a unique locking means for controlling the degree of expansion to which the expander is set.

It is well known that many forms of piston expanders have been devised to attempt to suitably expand the skirts of a piston sufficiently to compensate for the wear of the piston itself and the wear of the cylinder walls. One type of piston expander known to the art comprised a circular section of spring steel. This type maintains a continuous expanding pressure on the piston skirts and usually sets up an undesirable pressure on the cylinder walls thus causing undue wear. Another type of expander known to the art comprises a bolt assembly positioned between the struts of the older type of piston and which, through various adjustments, provides a means of expansion. This type of expander, such as shown in Patent #2,057,327, will, when installed by an expert, result in a satisfactory expansion. However, the limitations of this form of expander are chiefly due to the rigid unyielding expansion obtained, which will result in freezing or sticking of the piston if the expander has been set a little too tight. The present invention is an improvement over this form of expander in that it incorporates the use of a coil spring positioned about the bolt section of the expander in such manner that the expansion pressure exerted by the expander is carried at all times through the coil spring and while the skirts of the piston may be expanded to any desired degree, the incorporation of the coil spring provides a flexibility that becomes highly important when the piston itself expands due to operating conditions. In the present invention, I provide a piston expander adapted for use in the newer forms of pistons and in which it is positioned in openings in the skirts of the piston on the side of the piston adjacent to the slot thereof, thus expansion is directly against the skirts of the piston. It is possible by using the device shown and described herein to re-shape the piston through expanding the skirt to its original size or larger so that the piston will conform with any irregularities in the cylinder wall.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Fig. 1 is a view of the piston expander completely assembled.

Fig. 2 is a detail view of a bolt portion of the expander shown in Fig. 1.

Fig. 3 is a detail view of one of the flanged bushings shown in Fig. 1.

Fig. 4 is a detail view of the adjustment nut shown in Fig. 1.

Fig. 5 is a detail view of the self-locking coil spring shown in Fig. 1.

Fig. 6 is a detail view of the other flanged bushing shown in Fig. 1.

The parts shown in Figs. 2, 3, 4, 5, and 6 comprise the expander shown in Fig. 1 and are shown in the drawings in approximately the positions they occupy when assembled.

Fig. 7 is a modified form of flanged bushing adapted to be used in place of the bushing shown in Fig. 3 when the expander is used in a piston having struts therein.

Fig. 8 is a detail view of a modified form of the bushing shown in Fig. 6 and is adapted to be used on an expander with the bushing shown in Fig. 7 when the expander is positioned between struts in a piston.

Fig. 9 is a detail view of a modified form of the bolt shown in Fig. 2; the threaded area being considerably larger in size and design for expanders subjected to abnormal expansion pressures.

Fig. 10 is a cross sectional view of a piston showing the expander shown in Fig. 1 positioned therein.

By referring to Fig. 1 of the drawing it will be seen that the piston expander comprises a threaded bolt 1; a pair of oppositely disposed unthreaded flanged bushings 2 and 3 are positioned on the opposite ends of the threaded bolt 1. The flanged bushing 2 being smaller than the flanged bushing 3 and is positioned upon a smaller unthreaded end 4 of the threaded bolt 1 (see Fig. 2). In order that this flanged bushing 2 may be positioned upon the bolt 1, a hole 5 has been drilled in the bolt 1 and a pair of holes 6 have been drilled in the flanged bushing 2. These holes are adapted to receive a cotter pin 7. Positioned upon the threaded bolt 1 and between the flanged bushings 2 and 3 there is an adjustment nut 8 and a coil spring 9. Raised portions 10 formed on the ends of the coil spring 9 are adapted to engage slots 11 in the adjustment nut 8 and flanged bushing 3. The flanged bushing 3 is positioned slidably upon the threaded bolt 1 and engages an opening in the piston skirt as does the flanged bushing 2. It will thus be seen that when assembled and positioned in a piston in openings in the piston skirt, the expander will exert expanding pressure against the piston skirt when the adjustment nut 8 is rotating toward the flanged bushing 3 thus tending to compress the coil spring 9 through which all of the expanding pressure is exerted.

It will be seen that due to the raised portions 10 formed on the ends of the coil spring 9 and the slots 11 in the contacting surfaces of the adjustment nut 8 and flanged bushing 3, the adjustment nut 8 will be efficiently locked in position at innumerable locations as the raised portions 10 engage the slots 11. By referring to Fig. 10 the expander will be seen positioned between the opposite sides 12 of the skirt of the piston and adjustment to the slot 13 therein. It will also be seen that due to its location it does not interfere with the adjustment wrist pin bearings 14.

When it is desired that the piston expander be positioned in a piston formed with struts therein, it is necessary that the flanged bushings 2 and 3 be removed and modified flanged bushings 15 and 16 (see Figs. 7 and 8) be used so that the flanges thereon are flat and will suitably engage the struts of the piston. Otherwise the expander is exactly the same as that used in the newer forms of pistons in which there are no struts. In this connection it will be seen that while some of the pistons being manufactured are provided with openings in the skirt in which the expander may be positioned, it is a simple task to drill openings in pistons not so equipped. It will also be seen that if the outer ends of the flanged bushings 2 and 3 extend through the skirt 12 of the piston that may be easily removed by grinding either before or after the device has been installed in the piston. When the piston expander is used in pistons subjected to extreme pressure such as in heavy duty air compressors, it has been found desirable to form the threaded bolt as shown in Fig. 9, wherein the threaded section 17 is considerably larger than normal so that a larger adjustment nut may be used to insure sufficient expanding action as the adjustment nut is rotated.

In order that additional adjustment may be made, the smaller unthreaded end 4 of the threaded bolt 1 is provided with a slot 18 cut into the end thereof so that a screw driver or similar tool may be used to rotate the bolt.

In installing this piston expander in a piston, it is necessary that the flanged bushing 3 be installed first, the threaded bolt 1 then being passed through this flanged bushing 3 into the piston and the various other portions of the device placed upon the bolt when it is partially in place in the piston. After the assembly is completed the cotter pin 7 is placed thus positively placing the expander in the piston, and the adjustment nut rotated until the correct expansion is obtained.

In adapting this piston expander for use in the new pistons using thermostatic controlled struts, it is only necessary to substitute a thermostatic spring for the spring ordinarily used in the expander, thus accurately controlling the degree of expansion throughout the temperature range of the piston.

Having thus described my invention, what I claim is:

1. A piston expander for adjusting the skirt of a slotted skirt piston comprising a pair of flanged bushings positioned in openings in the said skirt; a threaded bolt slidably positioned through and between the said flanged bushings; a coil spring positioned around the threaded bolt and adjacent to one of the said flanged bushings; a nut threaded on the said threaded bolt and adapted to move the said coil spring against the said flanged bushing so as to suitably expand the skirt of the said piston.

2. A piston expander for adjusting the skirt of a slotted skirt piston comprising a pair of flanged bushings positioned in openings in the said skirt; a threaded bolt slidably positioned through and between the said flanged bushings; a coil spring positioned around the threaded bolt and adjacent to one of the said flanged bushings; a nut threaded on the said threaded bolt and adapted to move the said coil spring against the said flanged bushing; the said flanged bushings formed so as to conform in shape with the inner sides of the said piston skirt so as to suitably expand the skirt of the said piston.

3. A piston expander for adjusting the struts of a slotted skirt piston comprising a pair of flanged bushings positioned in openings in the said struts; a threaded bolt slidably positioned through and between the said flanged bushings; a coil spring positioned around the threaded bolt and adjacent to one of the said flanged bushings; projections formed on the ends of said coil spring, a nut threaded on the said threaded bolt and adapted to move the said coil spring against the said flanged bushing so as to suitably expand the struts of the said piston slots formed crossways in said nut and the last mentioned flanged bushing, for registry with said projections on said spring, an opening in said bolt and in one of said flanged bushings and a key positioned in said openings so as to lock the said bolt to the said flanged bushing and thereby preventing the rotation of the said bolt, the registration of the said projections on the spring with the slots in the said nut and the flanged bushing preventing the rotation of the said nut on the said bolt, raised portions formed on the ends of the coil spring and slots formed on the said nut and the said flanged bushing so that the said raised portions of the spring register with the said slots to form locking means to prevent the nut from revolving on the said bolt, and an opening formed in the said bolt and in one of the said flanged bushings, and a key positioned in the said opening so as to lock the said bolt to the said flanged bushing and thereby prevent its rotation.

4. The combination of a piston comprising a slotted piston skirt having oppositely disposed openings therein; and a piston expander comprising a pair of flanged bushings positioned in the said openings; a threaded bolt positioned through and between the said bushings; a coil spring positioned around the said threaded bolt and adjacent to one of the said flanged bushings; a nut threadably positioned upon the said threaded bolt adjacent to the said coil spring and serving as a means of moving the said coil spring and the said flanged bushing in relation to the said threaded bolt and the other flanged bushing so as to suitably expand the skirt of the said piston.

5. The combination of a piston comprising a slotted piston skirt having parallel struts therein, the said parallel struts having oppositely disposed openings; a piston expander comprising a pair of flanged bushings positioned in the said openings; a threaded bolt positioned through and between the said bushings; a coil spring positioned around the said threaded bolt and adjacent to one of the said flanged bushings; a nut threadably positioned upon the said threaded bolt adjacent to the said coil spring and serving as a means of moving the said coil spring and the said flanged bushing in relation to the said threaded bolt and the other flanged bushing so as to suitably adjust the struts of the said piston for the purpose of expanding the skirt thereof.

6. A piston expander for adjusting the skirt of a slotted skirt piston comprising a pair of flanged bushings positioned in openings in the said skirt; a threaded bolt slideably positioned through and between the said flanged bushings; a coil spring positioned around the threaded bolt and adjacent to one of the said flanged bushings; a nut threaded on the said threaded bolt and adapted to move the said coil spring against the said flanged bushing; the said flanged bushings formed so as to conform in shape with the inner sides of the said piston skirt; an opening in said bolt and in one of said flanged bushings and a key positioned in said openings so as to lock the said bolt to the said flanged bushing and thereby prevent the rotation of the said bolt.

7. A piston expander for adjusting the skirt of a slotted skirt piston comprising a pair of flanged bushings positioned in openings in the said skirt, a threaded bolt slideably positioned through and between the said flanged bushings; a coil spring positioned around the threaded bolt and adjacent to one of the said flanged bushings; a nut threaded on the said threaded bolt and adapted to moving the said coil spring against the said flanged bushing; raised portions formed on the ends of the said coil spring; slots formed in the said nut and said flanged bushing, between which the said coil spring is placed, so that the said raised portions of the spring registers with the said slots to form locking means to prevent the nut from revolving on the said bolt.

FRANK E. WELLS.